United States Patent
Ichikawa

(10) Patent No.: US 9,559,550 B2
(45) Date of Patent: Jan. 31, 2017

(54) CONTACTLESS POWER RECEIVING APPARATUS AND VEHICLE INCORPORATING SAME, CONTACTLESS POWER FEEDING FACILITY, METHOD OF CONTROLLING CONTACTLESS POWER RECEIVING APPARATUS, AND METHOD OF CONTROLLING CONTACTLESS POWER FEEDING FACILITY

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 634 days.

(21) Appl. No.: 13/977,993

(22) PCT Filed: Feb. 15, 2011

(86) PCT No.: PCT/JP2011/053118
§ 371 (c)(1),
(2), (4) Date: Jul. 2, 2013

(87) PCT Pub. No.: WO2012/111085
PCT Pub. Date: Aug. 23, 2012

(65) Prior Publication Data
US 2013/0313893 A1    Nov. 28, 2013

(51) Int. Cl.
*H01F 27/42* (2006.01)
*H01F 37/00* (2006.01)
(Continued)

(52) U.S. Cl.
CPC .............. *H02J 17/00* (2013.01); *B60L 11/005* (2013.01); *B60L 11/182* (2013.01);
(Continued)

(58) Field of Classification Search
CPC .......... H02J 17/00; H02J 17/005; H02J 7/025; B60L 11/182; Y02T 90/122
(Continued)

(56) References Cited

U.S. PATENT DOCUMENTS

| 7,741,734 B2 | 6/2010 | Joannopoulos et al. |
| 8,248,027 B2* | 8/2012 | Sakoda ............ H02J 5/005 307/104 |

(Continued)

FOREIGN PATENT DOCUMENTS

| AU | 2006269374 B2 | 1/2007 |
| AU | 2006269374 C1 | 1/2007 |

(Continued)

*Primary Examiner* — Rexford Barnie
*Assistant Examiner* — Rasem Mourad
(74) *Attorney, Agent, or Firm* — Oliff PLC

(57) ABSTRACT

A method capable of efficiently adjusting both the resonance frequency and impedance of a resonant system in contactless power transmission by a resonance method is provided. A variable capacitor adjusts a resonance frequency of a secondary self-resonant coil. An impedance matching box adjusts an input impedance of a resonant system. An ECU first adjusts the resonance frequency of the secondary self-resonant coil by controlling the variable capacitor, and after the adjustment of the resonance frequency, adjusts the input impedance of the resonant system by controlling the impedance matching box. During the adjustment of the resonance frequency by the variable capacitor, the ECU sets an impedance of the impedance matching box to a predetermined fixed value.

5 Claims, 7 Drawing Sheets

(51) Int. Cl.
*H01F 38/00* (2006.01)
*H02J 17/00* (2006.01)
*H02J 5/00* (2016.01)
*B60L 11/00* (2006.01)
*B60L 11/18* (2006.01)

(52) U.S. Cl.
CPC ........... *B60L 11/1833* (2013.01); *H02J 5/005* (2013.01); *B60L 2210/30* (2013.01); *B60L 2210/40* (2013.01); *Y02T 10/7005* (2013.01); *Y02T 10/7022* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC .......................................... 307/104; 320/108
See application file for complete search history.

(56) References Cited

U.S. PATENT DOCUMENTS

| | | | |
|---|---|---|---|
| 8,432,066 B2* | 4/2013 | Takada | G06F 17/5063 307/104 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181843 A1 | 7/2010 | Schatz et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0049995 A1* | 3/2011 | Hashiguchi | H02J 5/005 307/104 |
| 2011/0095618 A1* | 4/2011 | Schatz | H03H 7/40 307/104 |
| 2011/0169337 A1* | 7/2011 | Kozakai | H02J 5/005 307/104 |
| 2011/0175455 A1* | 7/2011 | Hashiguchi | H02J 17/00 307/104 |
| 2011/0241440 A1* | 10/2011 | Sakoda | H02J 5/005 307/104 |
| 2012/0056485 A1* | 3/2012 | Haruyama | H02J 5/005 307/104 |
| 2012/0098348 A1 | 4/2012 | Inoue et al. | |
| 2012/0306265 A1 | 12/2012 | Yamamoto et al. | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | H11-188113 A | 7/1999 |
| JP | A-2002-272134 | 9/2002 |
| JP | A-2009-501510 | 1/2009 |
| JP | 2010252446 A | 11/2010 |
| JP | A-2011-166994 | 8/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/067763 A1 | 6/2010 |
| WO | 2011/098888 A2 | 8/2011 |

* cited by examiner

CONTACTLESS POWER RECEIVING APPARATUS AND VEHICLE INCORPORATING SAME, CONTACTLESS POWER FEEDING FACILITY, METHOD OF CONTROLLING CONTACTLESS POWER RECEIVING APPARATUS, AND METHOD OF CONTROLLING CONTACTLESS POWER FEEDING FACILITY

TECHNICAL FIELD

The present invention relates to a contactless power receiving apparatus and a vehicle incorporating the same, a contactless power feeding facility, a method of controlling the contactless power receiving apparatus, and a method of controlling the contactless power feeding facility, and more particularly to a contactless power transmission technique in which a power transmission unit and a power reception unit resonate with each other through an electromagnetic field to transmit power in a contactless manner.

BACKGROUND ART

Electrically powered vehicles such as electric vehicles and hybrid vehicles have attracted a lot of attention as environmentally friendly vehicles. These vehicles incorporate a motor for generating a driving force for running, and a rechargeable power storage device for storing power supplied to the motor. A hybrid vehicle refers to a vehicle incorporating a motor as well as an internal combustion engine as a power source, a vehicle incorporating a power storage device as well as a fuel cell as a direct-current power supply, and the like.

As with an electric vehicle, a hybrid vehicle having a vehicle-mounted power storage device that can be charged from a power supply outside of the vehicle is known. For example, a so-called "plug-in hybrid vehicle" is known in which a power storage device can be charged from a power supply of an ordinary household by connecting a power supply outlet provided in the house to a charging inlet provided on the vehicle by a charging cable.

Contactless power transmission without using a power cord or a power transmission cable has been receiving attention in recent years as a power transmission method. Power transmission using electromagnetic induction, power transmission using a microwave, and power transmission by a resonance method are three dominant techniques known for the contactless power transmission.

Japanese Patent Laying-Open No. 2002-272134 (Patent Document 1) discloses a contactless power feeding apparatus using electromagnetic induction. This contactless power feeding apparatus includes a high-frequency power supply unit, a primary lead, a power receiving coil, a resistance detection circuit, and a frequency control unit. The high-frequency power supply unit generates high-frequency electric power. The primary lead converts the high-frequency power generated by the high-frequency power supply unit to a high-frequency magnetic flux. The power receiving coil receives the high-frequency power in a contactless manner from the primary lead by the action of electromagnetic induction, and supplies the same to a load. The resistance detection circuit detects a resistance component of the load. The frequency control unit controls the frequency of the high-frequency power generated by the high-frequency power supply unit, in accordance with the resistance component of the load detected by the resistance detection circuit.

According to this contactless power feeding apparatus, the frequency of the high-frequency power generated by the high-frequency power supply unit is controlled in accordance with the resistance component of the load detected by the resistance detection circuit, so that the power factor of the high-frequency power output from the high-frequency power supply unit can be substantially close to "1". According to this document, this increases efficiency of power consumed in the load relative to apparent power (voltage× current) supplied by the high-frequency power supply unit, thereby attaining efficient power transmission (see Patent Document 1).

CITATION LIST

Patent Document

PTD 1: Japanese Patent Laying-Open No. 2002-272134

SUMMARY OF INVENTION

Technical Problem

The aforementioned resonance method is a contactless power transmission technique for causing a pair of resonators (e.g., a pair of coils) to resonate with each other in an electromagnetic field (near field) to transmit power through the electromagnetic field, and can transmit a large amount of power of several kW across a relatively long distance (e.g., several meters).

In the resonance method, the resonance frequency and impedance of a resonant system varies with variation in relative positions of a resonator on the power transmission side and a resonator on the power reception side. It is therefore necessary to adjust the resonance frequency and impedance of the resonant system in accordance with the state of positions of a power feeding facility and a power receiving apparatus, before the start of power transmission from the power feeding facility to the power receiving apparatus.

Although the aforementioned Patent Document 1 discloses controlling the frequency of the high-frequency electric power generated by the high-frequency power supply unit in accordance with the resistance component of the load in contactless power transmission using electromagnetic induction, it does not particularly discuss a method of adjusting the resonance frequency and impedance of a resonant system in the resonance method.

An object of the present invention, therefore, is to provide a method capable of efficiently adjusting both the resonance frequency and impedance of a resonant system in contactless power transmission by the resonance method.

Solution to Problem

According to the present invention, a contactless power receiving apparatus for receiving electric power in a contactless manner from a power feeding facility including a power transmission unit includes a power reception unit, first and second adjustment devices, and a control device. The power reception unit resonates with the power transmission unit through an electromagnetic field to receive the power in a contactless manner from the power transmission unit. The first adjustment device adjusts a resonance frequency of the power reception unit. The second adjustment device adjusts an input impedance of a resonant system composed of the power transmission unit and the power reception unit. The control device first adjusts the resonance frequency by controlling the first adjustment device, and after the adjustment of the resonance frequency, adjusts the input impedance of the resonant system by controlling the second adjustment device. During the adjustment of the resonance frequency by the first adjustment device, the control device sets an impedance of the second adjustment device to a predetermined fixed value.

Preferably, the second adjustment device includes a variable impedance portion. The variable impedance portion is provided between the power reception unit and a load for receiving the power received by the power reception unit. During the adjustment of the resonance frequency by the first adjustment device, the control device sets an impedance of the variable impedance portion to the fixed value.

Preferably, the second adjustment device includes a variable impedance portion and a bypass circuit. The variable impedance portion is provided between the power reception unit and a load for receiving the power received by the power reception unit. The bypass circuit bypasses the variable impedance portion. During the adjustment of the resonance frequency by the first adjustment device, the control device sets an impedance of the variable impedance portion to the fixed value by bypassing the variable impedance portion with the bypass circuit.

Preferably, the power feeding facility further includes a power supply for generating electric power having a predetermined frequency. The predetermined fixed value is a value for matching the input impedance of the resonant system to an impedance of the power supply.

According to the present invention, a vehicle incorporates one of the contactless power receiving apparatuses described above.

According to the present invention, a contactless power feeding facility for transmitting electric power in a contactless manner to a power receiving apparatus including a power reception unit includes a power supply, a power transmission unit, first and second adjustment devices, and a control device. The power supply generates electric power having a predetermined frequency. The power transmission unit receives the power from the power supply, and resonates with the power reception unit through an electromagnetic field to transmit the power in a contactless manner to the power reception unit. The first adjustment device adjusts a resonance frequency of the power transmission unit. The second adjustment device adjusts an input impedance of a resonant system composed of the power transmission unit and the power reception unit. The control device first adjusts the resonance frequency by controlling the first adjustment device, and after the adjustment of the resonance frequency, adjusts the input impedance of the resonant system by controlling the second adjustment device. During the adjustment of the resonance frequency by the first adjustment device, the control device sets an impedance of the second adjustment device to a predetermined fixed value.

Preferably, the second adjustment device includes a variable impedance portion. The variable impedance portion is provided between the power supply and the power transmission unit. During the adjustment of the resonance frequency by the first adjustment device, the control device sets an impedance of the variable impedance portion to the fixed value.

Preferably, the second adjustment device includes a variable impedance portion and a bypass circuit. The variable impedance portion is provided between the power supply and the power transmission unit. The bypass circuit bypasses the variable impedance portion. During the adjustment of the resonance frequency by the first adjustment device, the control device sets an impedance of the variable impedance portion to the fixed value by bypassing the variable impedance portion with the bypass circuit.

Preferably, the predetermined fixed value is a value for matching the input impedance of the resonant system to an impedance of the power supply.

According to the present invention, a method of controlling a contactless power receiving apparatus for receiving electric power in a contactless manner from a power feeding facility including a power transmission unit is provided. The contactless power receiving apparatus includes a power reception unit, and first and second adjustment devices. The power reception unit resonates with the power transmission unit through an electromagnetic field to receive the power in a contactless manner from the power transmission unit. The first adjustment device adjusts a resonance frequency of the power reception unit. The second adjustment device adjusts an input impedance of a resonant system composed of the power transmission unit and the power reception unit. The control method includes the steps of setting an impedance of the second adjustment device to a predetermined fixed value, adjusting the resonance frequency after the setting of the impedance, and adjusting the input impedance of the resonant system after the adjustment of the resonance frequency.

According to the present invention, a method of controlling a contactless power feeding facility for transmitting electric power in a contactless manner to a power receiving apparatus including a power reception unit is provided. The contactless power feeding facility includes a power supply, a power transmission unit; and first and second adjustment devices. The power supply generates electric power having a predetermined frequency. The power transmission unit receives the power from the power supply, and resonates with the power reception unit through an electromagnetic field to transmit the power in a contactless manner to the power reception unit. The first adjustment device adjusts a resonance frequency of the power transmission unit. The second adjustment device adjusts an input impedance of a resonant system composed of the power transmission unit and the power reception unit. The control method includes the steps of setting an impedance of the second adjustment device to a predetermined fixed value, adjusting the resonance frequency after the setting of the impedance, and adjusting the input impedance of the resonant system after the adjustment of the resonance frequency.

Advantageous Effects of Invention

In the contactless power receiving apparatus of the present invention, the resonance frequency is first adjusted by controlling the first adjustment device, and after the adjustment of the resonance frequency, the input impedance of the resonant system is adjusted by controlling the second adjustment device. During the adjustment of the resonance frequency by the first adjustment device, the impedance of the second adjustment device is set to the predetermined fixed value. According to the contactless power receiving apparatus of the present invention, therefore, both the resonance frequency and impedance of the resonant system can be efficiently adjusted.

In the contactless power feeding facility of the present invention, the resonance frequency is first adjusted by controlling the first adjustment device, and after the adjustment of the resonance frequency, the input impedance of the resonant system is adjusted by controlling the second adjustment device. During the adjustment of the resonance frequency by the first adjustment device, the impedance of the second adjustment device is set to the predetermined fixed value. According to the contactless power feeding facility of the present invention, therefore, both the resonance frequency and impedance of the resonant system can be efficiently adjusted.

DESCRIPTION OF EMBODIMENTS

The embodiments of the present invention will be hereinafter described in detail with reference to the drawings, in which the same or corresponding components are designated by the same characters, and description thereof will not be repeated.

First Embodiment

Figure 1:
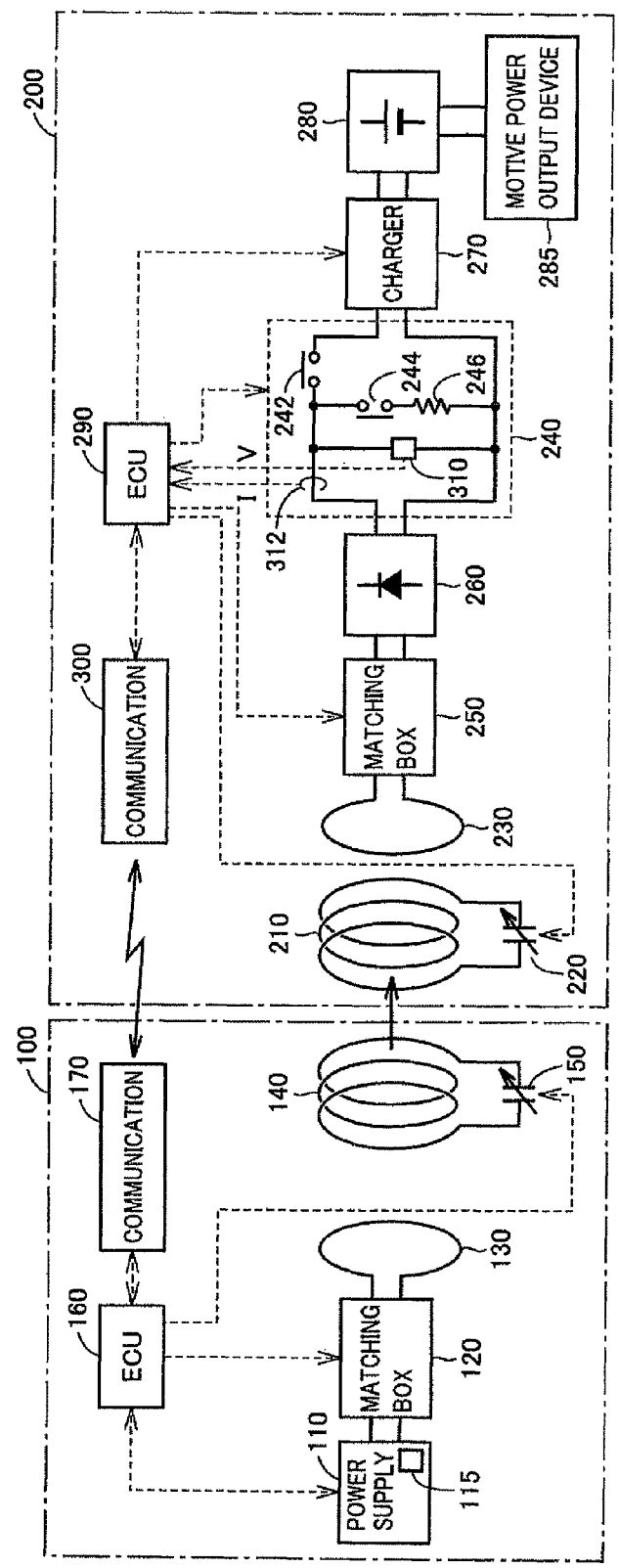
FIG. 1 is an overall configuration diagram of a contactless power transmission system according to a first embodiment of the present invention.

FIG. 1 is an overall configuration diagram of a contactless power transmission system according to a first embodiment of the present invention. Referring to FIG. 1, this contactless power transmission system includes a power feeding facility 100 and a vehicle 200.

Power feeding facility 100 includes a power supply device 110, a power sensor 115, an impedance matching box 120, a primary coil 130, a primary self-resonant coil 140, a variable capacitor 150, an electronic control unit (hereinafter referred to as "ECU") 160, and a communication device 170.

Power supply device 110 generates electric power having a predetermined frequency. As an example, power supply device 110 receives electric power from a not-shown system power supply, and generates electric power having a predetermined frequency of a little more than 10 MHz. Power supply device 110 controls the generation and interruption of power and output power in accordance with instructions received from ECU 160.

Power sensor 115 detects traveling wave power and reflected power in power supply device 110, and outputs the detected values to ECU 160. The traveling wave power refers to power that is output from power supply device 110. The reflected power refers to power that is output from power supply device 110 and reflected back to power supply device 110. A variety of known sensors capable of detecting the traveling wave power and reflected power in the power supply device can be used as power sensor 115.

Impedance matching box 120 is provided between power supply device 110 and primary coil 130, and configured to be able to vary the inner impedance. Impedance matching box 120 varies the impedance in accordance with an instruction received from ECU 160, to match an input impedance of a resonant system including primary coil 130, primary self-resonant coil 140 and variable capacitor 150, and a secondary self-resonant coil 210, a variable capacitor 220 and a secondary coil 230 (described later) of vehicle 200 (hereinafter simply referred to as "resonant system") to an impedance of power supply device 110.

Figure 2:
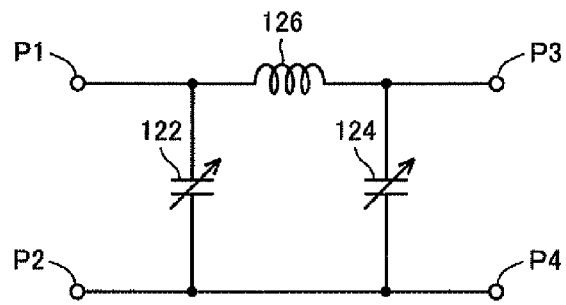
FIG. 2 is a circuit diagram showing an example of the circuit configuration of an impedance matching box.

FIG. 2 is a circuit diagram showing an example of the circuit configuration of impedance matching box 120. Referring to FIG. 2, impedance matching box 120 includes variable capacitors 122, 124, and a coil 126. Variable capacitor 122 is connected in parallel to power supply device 110 (FIG. 1). Variable capacitor 124 is connected in parallel to primary coil 130 (FIG. 1). Coil 126 is connected on one of a pair of power lines provided between power supply device 110 and primary coil 130, between connection nodes of variable capacitors 122 and 124.

In impedance matching box 120, the impedance is varied by varying the capacity of at least one of variable capacitors 122 and 124 in accordance with an instruction received from ECU 160 (FIG. 1). Thus, impedance matching box 120 matches the input impedance of the resonant system to the impedance of power supply device 110 in accordance with the instruction received from ECU 160.

Although not specifically shown, coil 126 may be formed of a variable coil, and the impedance may be varied by varying the inductance of the variable coil.

Referring again to FIG. 1, primary coil 130 is provided substantially coaxially with primary self-resonant coil 140 at a predetermined distance from primary self-resonant coil 140. Primary coil 130 is magnetically coupled to primary self-resonant coil 140 by electromagnetic induction, and supplies high-frequency power supplied from power supply device 110 to primary self-resonant coil 140 by electromagnetic induction.

Primary self-resonant coil 140 receives the power from primary coil 130 by electromagnetic induction, and resonates with secondary self-resonant coil 210 (described later) incorporated in vehicle 200 through an electromagnetic field to transmit the power to secondary self-resonant coil 210. The coil diameter and the number of turns of primary self-resonant coil 140 are appropriately determined so as to increase a Q value (e.g., Q>100) and a degree of coupling K, based on the distance from secondary self-resonant coil 210 of vehicle 200, a resonant frequency (frequency of the high-frequency power output from power supply device 110), and the like.

Primary self-resonant coil 140 is provided with variable capacitor 150. Variable capacitor 150 is connected, for example, between opposing ends of primary self-resonant coil 140. Variable capacitor 150 varies in capacitance in accordance with an instruction received from ECU 160, and is capable of adjusting a resonance frequency of primary self-resonant coil 140 by this capacitance variation.

It is noted that primary coil 130 is provided to facilitate the power feeding from power supply device 110 to primary self-resonant coil 140. Power supply device 110 may be directly connected to primary self-resonant coil 140 without providing primary coil 130.

During power transmission from power feeding facility 100 to vehicle 200, ECU 160 receives the detected values of reflected power and traveling wave power from power sensor 115, and receives a receiving state of vehicle 200 received via communication device 170. The receiving state of vehicle 200 includes information such as a receiving voltage, a receiving current and receiving power in vehicle 200. ECU 160 then performs a predetermined process by software processing of executing a prestored program with a CPU (Central Processing Unit) and/or by hardware processing with a dedicated electronic circuit.

Specifically, ECU 160 controls the operation of power supply device 110. In addition, ECU 160 adjusts the resonance frequency of primary self-resonant coil 140 by variable capacitor 150, and adjusts the impedance of impedance matching box 120, prior to charging of a power storage device 280 (described later) of vehicle 200 by power feeding facility 100.

During the adjustment, ECU 160 first adjusts the resonance frequency of primary self-resonant coil 140 by controlling variable capacitor 150, and after the adjustment of the resonance frequency, adjusts the impedance by controlling impedance matching box 120. During the adjustment of the resonance frequency by variable capacitor 150, ECU 160 sets the impedance of impedance matching box 120 to a predetermined fixed value. This fixed value is a value prepared in advance so as to match the input impedance of the resonant system to the impedance of power supply device 110, and is determined based on the impedance of power supply device 110.

When the adjustment in power feeding facility 100 is completed, ECU 160 transmits an instruction to start adjustment in vehicle 200 to vehicle 200 via communication device 170.

ECU 160 estimates a position mismatch amount of secondary self-resonant coil 210 relative to primary self-resonant coil 140 (hereinafter simply referred to as "position mismatch amount"), and adjusts the resonance frequency of primary self-resonant coil 140 and the impedance of impedance matching box 120 by using the estimated position mismatch amount. As a method of estimating the position mismatch amount, ECU 160 estimates the position mismatch amount based on the receiving state of vehicle 200 and the reflected power to power supply device 110. Primary self-resonant coil 140 and secondary self-resonant coil 210 are provided such that their central axes are parallel to each other, and an offset amount of the central axis of secondary self-resonant coil 210 relative to the central axis of primary self-resonant coil 140 is referred to as the "position mismatch amount." Each of the aforementioned processes performed by ECU 160 will be described later in detail.

Communication device 170 serves as a communication interface for establishing communication with vehicle 200. An instruction to start adjustment in vehicle 200, information on power feeding facility 100 such as reflected power, an instruction to start practical power feeding for charging power storage device 280 and the like are transmitted via communication device 170 to vehicle 200. In addition, a receiving state of vehicle 200, a state of charge (hereinafter also referred to as "SOC") of power storage device 280, a signal indicating the completion of adjustment in vehicle 200 and the like are received via communication device 170 from vehicle 200.

Vehicle 200 includes secondary self-resonant coil 210, variable capacitor 220, secondary coil 230, an impedance matching box 250, a rectifier 260, a switching device 240, a charger 270, power storage device 280, and a motive power output device 285. Vehicle 200 further includes an ECU 290, a communication device 300, a voltage sensor 310, and a current sensor 312.

Secondary self-resonant coil 210 resonates with primary self-resonant coil 140 of power feeding facility 100 through an electromagnetic field to receive power from primary self-resonant coil 140. The coil diameter and the number of turns of secondary self-resonant coil 210 are appropriately determined so as to increase a Q value (e.g., Q>100) and a degree of coupling x, based on the distance from primary self-resonant coil 140 of power feeding facility 100, the resonant frequency and the like.

Secondary self-resonant coil 210 is provided with variable capacitor 220. Variable capacitor 220 is connected, for example, between opposing ends of secondary self-resonant coil 210. Variable capacitor 220 varies in capacitance in accordance with an instruction received from ECU 290, and is capable of adjusting a resonance frequency of secondary self-resonant coil 210 by this capacitance variation.

Secondary coil 230 is provided substantially coaxially with secondary self-resonant coil 210 at a predetermined distance from secondary self-resonant coil 210. Secondary coil 230 is magnetically coupled to secondary self-resonant coil 210 by electromagnetic induction, and extracts the power received by secondary self-resonant coil 210 by electromagnetic induction.

It is noted that secondary coil 230 is provided to facilitate the extraction of power from secondary self-resonant coil 210. Impedance matching box 250 may be directly connected to secondary self-resonant coil 210 without providing secondary coil 230.

Impedance matching box 250 is provided between secondary coil 230 and rectifier 260, and configured to be able to vary the inner impedance. Impedance matching box 250 varies the impedance in accordance with an instruction received from ECU 290, to match the input impedance of the resonant system to the impedance of power supply device 110. It is noted that impedance matching box 250 has a configuration the same as that of impedance matching box 120 of power feeding facility 100 shown in FIG. 2.

Rectifier 260 rectifies the electric power (alternating current) extracted by secondary coil 230. Switching device 240 is provided between rectifier 260 and charger 270. Switching device 240 includes relays 242, 244, and a resistive element 246. Relay 242 is provided on a power line between rectifier 260 and charger 270. Relay 244 and resistive element 246 are connected in series between a pair of power lines between rectifier 260 and charger 270, closer to rectifier 260 than relay 242.

During charging of power storage device 280 by power feeding facility 100, relays 242 and 244 are turned on and off, respectively. During the adjustment process of adjusting the resonance frequency of the self-resonant coil and the impedance of the impedance matching box in power feeding facility 100 and vehicle 200 (hereinafter simply referred to as "adjustment process"), on the other hand, relays 242 and 244 are turned off and on, respectively. Thus, a load of vehicle 200 whose impedance varies with the SOC of power storage device 280 is disconnected from the resonant system, thus allowing the adjustment of the resonance frequency and impedance to be stably performed.

Charger 270 converts the voltage of direct-current power rectified by rectifier 260 to a charging voltage of power storage device 280, and outputs the same to power storage device 280. Power storage device 280 is a rechargeable direct-current power supply, and formed of a secondary battery such as a lithium-ion battery or a nickel-metal hydride battery. Power storage device 280 stores the power received from charger 270, and also stores regenerative power generated by motive power output device 285. Power storage device 280 then supplies the stored power to motive power output device 285. A capacitor having a large capacity can be employed as power storage device 280.

Motive power output device 285 generates a driving force for running of vehicle 200 by using the power stored in power storage device 280. Although not specifically shown, motive power output device 285 includes an inverter for receiving power from power storage device 280, a motor driven by the inverter, and drive wheels driven by the motor, for example. Motive power output device 285 may include a power generator for charging power storage device 280, and an engine capable of driving the power generator.

Voltage sensor 310 detects a voltage V output from secondary coil 230, and outputs the detected value to ECU 290. Current sensor 312 detects a current I output from rectifier 260, and outputs the detected value to ECU 290. ECU 290 receives the detected values of voltage V and current I from voltage sensor 310 and current sensor 312, respectively. ECU 290 also receives the various instructions and information transmitted from power feeding facility 100 via communication device 300. ECU 290 then performs a predetermined process by software processing of executing a prestored program with a CPU and/or by hardware processing with a dedicated electronic circuit.

Specifically, ECU 290 adjusts the resonance frequency of secondary self-resonant coil 210 by variable capacitor 220, and adjusts an impedance of impedance matching box 250, in accordance with an instruction to start adjustment received from power feeding facility 100. During the adjustment, ECU 290 first adjusts the resonance frequency of secondary self-resonant coil 210 by controlling variable capacitor 220, and after the adjustment of the resonance frequency, adjusts the impedance by controlling impedance matching box 250. During the adjustment of the resonance frequency by variable capacitor 220, ECU 290 sets the impedance of impedance matching box 250 to a predetermined fixed value. This fixed value is also a value prepared in advance so as to match the input impedance of the resonant system to the impedance of power supply device 110, and is determined based on the impedance of power supply device 110.

When the adjustment in vehicle 200 is completed, ECU 290 transmits a signal indicating the completion of adjustment to power feeding facility 100 via communication device 300. When the practical power feeding for charging power storage device 280 is subsequently started, ECU 290 charges power storage device 280 by controlling charger 270. Each of the aforementioned processes performed by ECU 290 will be described later in detail. Communication device 300 serves as a communication interface for establishing communication with power feeding facility 100.

In this contactless power transmission system, primary self-resonant coil 140 resonates with secondary self-resonant coil 210 through an electromagnetic field to transmit power from power feeding facility 100 to vehicle 200. Power feeding facility 100 is provided with variable capacitor 150 for adjusting the resonance frequency of primary self-resonant coil 140, and impedance matching box 120 for adjusting the input impedance of the resonant system.

The resonance frequency of primary self-resonant coil 140 is adjusted to the resonant frequency (frequency of the high-frequency power output from power supply device 110) by controlling variable capacitor 150. Then, after the adjustment of the resonance frequency of primary self-resonant coil 140, the input impedance of the resonant system is adjusted to the impedance of power supply device 110 by controlling impedance matching box 120. During the adjustment of the resonance frequency by variable capacitor 150, the impedance of impedance matching box 120 is set to the fixed value prepared in advance.

Furthermore, vehicle 200 is provided with variable capacitor 220 for adjusting the resonance frequency of secondary self-resonant coil 210, and impedance matching box 250 for adjusting the input impedance of the resonant system. The resonance frequency of secondary self-resonant coil 210 is adjusted to the resonant frequency by controlling variable capacitor 220. Then, after the adjustment of the resonance frequency of secondary self-resonant coil 210, the input impedance of the resonant system is adjusted to the impedance of power supply device 110 by controlling impedance matching box 250. During the adjustment of the resonance frequency by variable capacitor 220, the impedance of impedance matching box 250 is set to the fixed value prepared in advance.

Figure 3:
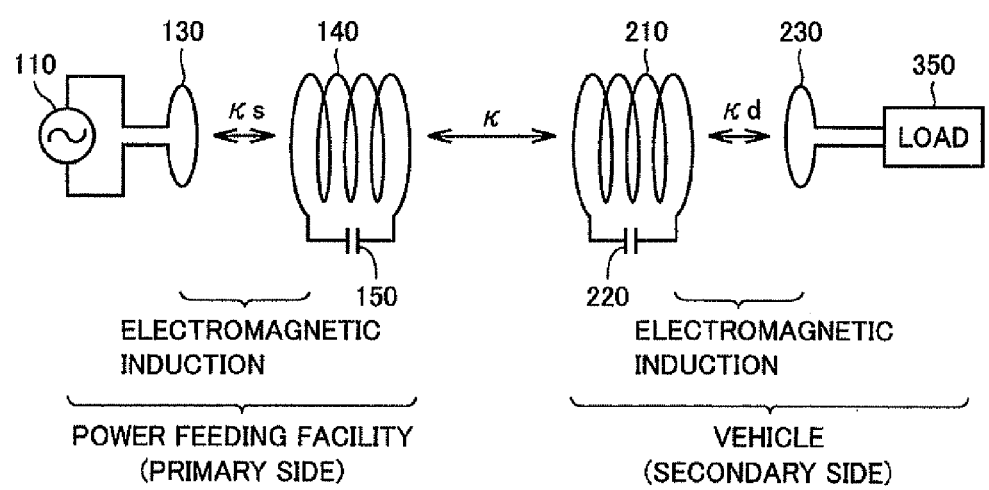
FIG. 3 is a diagram for illustrating the principle of power transmission by a resonance method.

FIG. 3 is a diagram for illustrating the principle of power transmission by a resonance method. Referring to FIG. 3, according to this resonance method, as in the case where two tuning forks resonate with each other, two LC resonant coils having the same natural frequency resonate with each other in an electromagnetic field (near field), which causes electric power to be transmitted from one of the coils to the other coil through the electromagnetic field.

Specifically, primary coil 130 is connected to power supply device 110 to feed electric power having a high-frequency of a little more than 10 MHz to primary self-resonant coil 140 magnetically coupled to primary coil 130 by electromagnetic induction. Primary self-resonant coil 140 constitutes an LC resonator together with variable capacitor 150, and resonates through an electromagnetic field (near field) with secondary self-resonant coil 210 having a resonance frequency adjusted to be the same as that of primary self-resonant coil 140. This causes the energy (electric power) to be transferred from primary self-resonant coil 140 through the electromagnetic field to secondary self-resonant coil 210. The energy (electric power) transferred to secondary self-resonant coil 210 is extracted by secondary coil 230 magnetically coupled to secondary self-resonant coil 210 by electromagnetic induction, and supplied to a load 350 subsequent to rectifier 260 (FIG. 1). It is noted that the power transmission by the resonance method is implemented when a Q value showing the intensity of resonance between primary self-resonant coil 140 and secondary self-resonant coil 210 is greater than, for example, 100.

Figure 4:
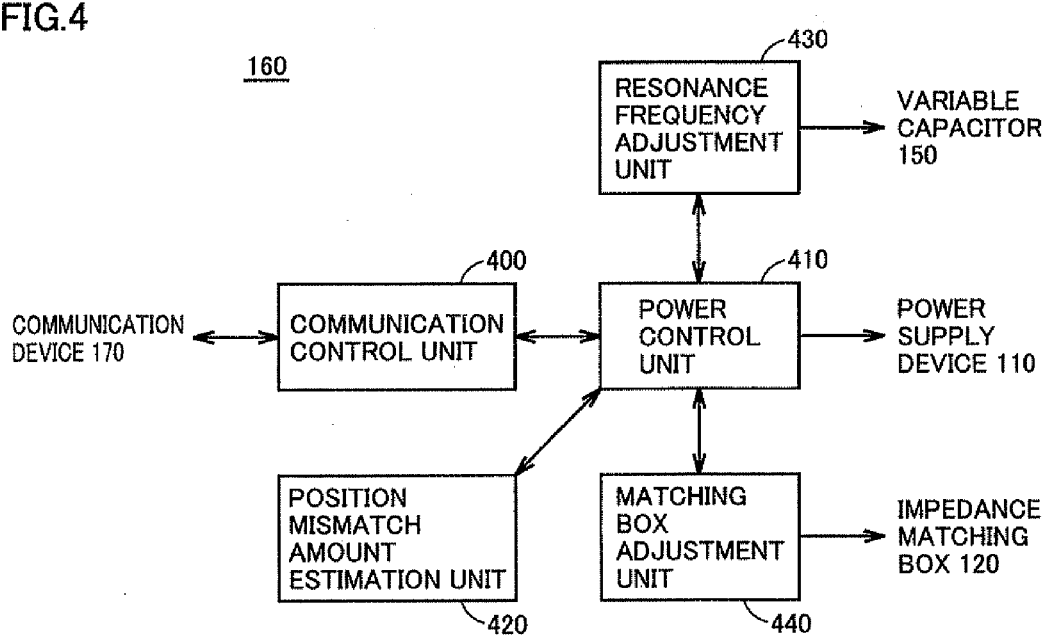
FIG. 4 is a functional block diagram of an ECU of a power feeding facility.

FIG. 4 is a functional block diagram of ECU 160 of power feeding facility 100. Referring to FIG. 4, ECU 160 includes a communication control unit 400, a power control unit 410, a position mismatch amount estimation unit 420, a resonance frequency adjustment unit 430, and a matching box adjustment unit 440.

Communication control unit 400 controls the communication with vehicle 200 via communication device 170 (FIG. 1). Specifically, communication control unit 400 transmits an instruction to start the adjustment process to vehicle 200 prior to charging of power storage device 280 in vehicle 200 by power feeding facility 100. Communication control unit 400 also transmits a position mismatch amount estimated by position mismatch amount estimation unit 420 to vehicle 200. Furthermore, communication control unit 400 transmits information on power feeding facility 100 such as reflected power to vehicle 200, and receives a receiving state of vehicle 200 from vehicle 200.

Power control unit 410 controls the power fed to vehicle 200 by controlling power supply device 110. During the adjustment process, power control unit 410 controls power supply device 110 to output power (power for adjustment) lower than that during the practical power feeding for charging power storage device 280.

Position mismatch amount estimation unit 420 estimates a position mismatch amount of secondary self-resonant coil 210 relative to primary self-resonant coil 140, based on the receiving voltage included in the receiving state of vehicle 200 received from vehicle 200 and the reflected power detected by power sensor 115 (FIG. 1).

Figure 5:
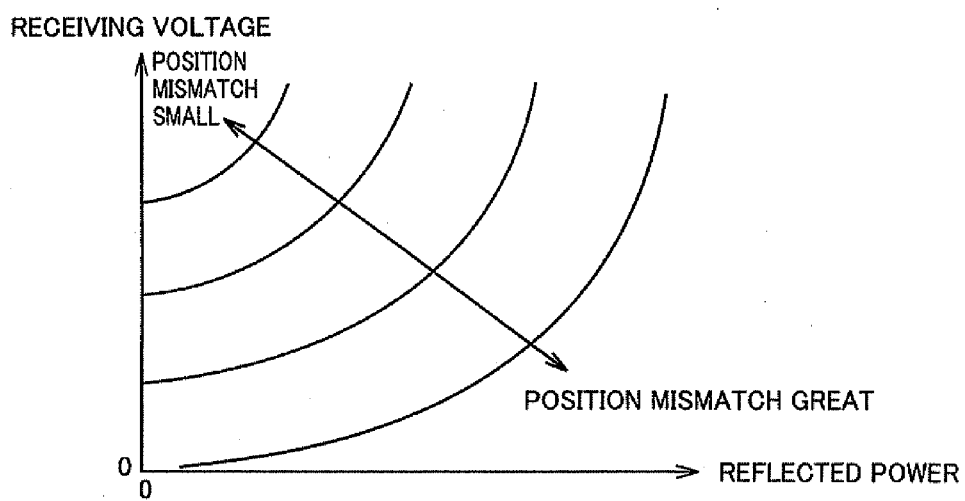
FIG. 5 shows relation between a receiving voltage and reflected power, and a position mismatch amount.

FIG. 5 shows relation between the receiving voltage and the reflected power, and the position mismatch amount. Referring to FIG. 5, when the position mismatch amount is small, the receiving voltage in vehicle 200 is high and the reflected power in power feeding facility 100 is low. When the position mismatch amount is great, on the other hand, the receiving voltage is low and the reflected power is high.

Accordingly, a map or the like is prepared by obtaining in advance such relation between the receiving voltage and the reflected power, and the position mismatch amount. Then, the map or the like is used to estimate the position mismatch amount based on the receiving voltage and reflected power detected during power transmission from power feeding facility 100 to vehicle 200.

Although not specifically shown, receiving power can be used instead of the receiving voltage. That is, when the position mismatch amount is small, the receiving power in vehicle 200 is high and the reflected power in power feeding facility 100 is low. When the position mismatch amount is great, on the other hand, the receiving power is low and the reflected power is high. Accordingly, a map or the like may be prepared by obtaining in advance the relation between the receiving power and the reflected power, and the position mismatch amount. Then, the map or the like may be used to estimate the position mismatch amount based on the receiving power and reflected power detected during power transmission from power feeding facility 100 to vehicle 200.

Referring again to FIG. 4, when the position mismatch amount is estimated, matching box adjustment unit 440 sets the impedance of impedance matching box 120 to a predetermined fixed value. As discussed above, this fixed value is a value prepared in advance so as to match the input impedance of the resonant system to the impedance of power supply device 110, and is determined based on the impedance of power supply device 110.

When the impedance of impedance matching box 120 is set to the predetermined fixed value, resonance frequency adjustment unit 430 adjusts the capacity of variable capacitor 150 to match the resonance frequency of primary self-resonant coil 140 to the resonant frequency (frequency of the high-frequency power output from power supply device 110). Specifically, the distance between primary self-resonant coil 140 and secondary self-resonant coil 210 is estimated using the position mismatch amount estimated by position mismatch amount estimation unit 420, and the capacity of variable capacitor 150 is adjusted based on the estimated distance between the coils.

Figure 6:
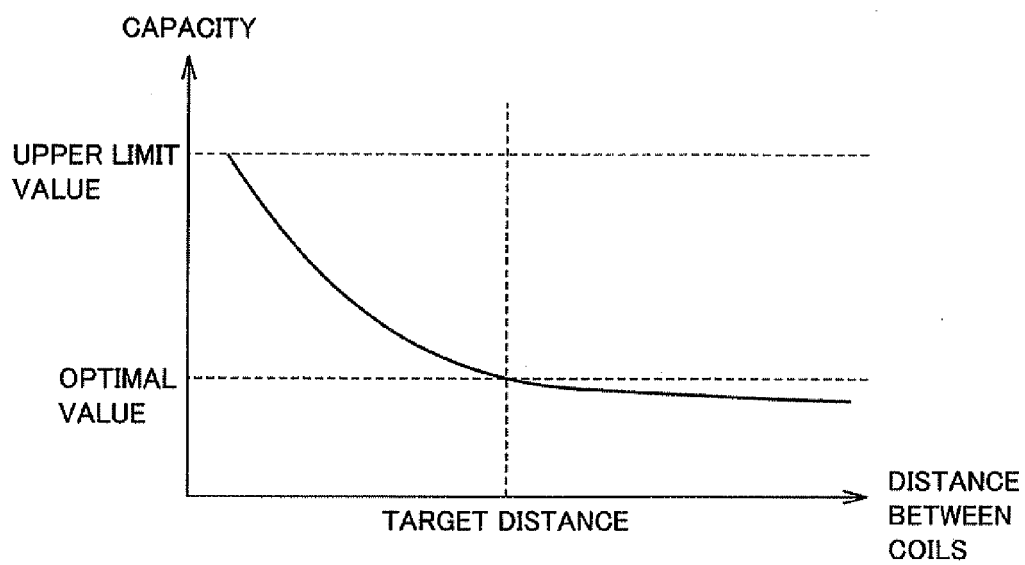
FIG. 6 shows an example of relation between the distance between a primary self-resonant coil and a secondary self-resonant coil, and an adjusted value of the capacity of a variable capacitor.

FIG. 6 shows an example of relation between the distance between primary self-resonant coil 140 and secondary self-resonant coil 210, and an adjusted value of the capacity of variable capacitor 150. Referring to FIG. 6, a map or the like is prepared by obtaining in advance the relation between the distance between primary self-resonant coil 140 and secondary self-resonant coil 210 (distance between coils) and an optimal value of the capacity of the variable capacitor when the resonance frequencies of the self-resonance coils match the resonant frequency. Then, the map or the like is used to adjust the capacity of variable capacitor 150 based on the distance between the coils estimated from the position mismatch amount.

Referring again to FIG. 4, when the adjustment of variable capacitor 150 is completed, matching box adjustment unit 440 adjusts the impedance of impedance matching box 120 to match the input impedance of the resonant system to the impedance of power supply device 110, based on the position mismatch amount estimated by position mismatch amount estimation unit 420.

Figure 7:
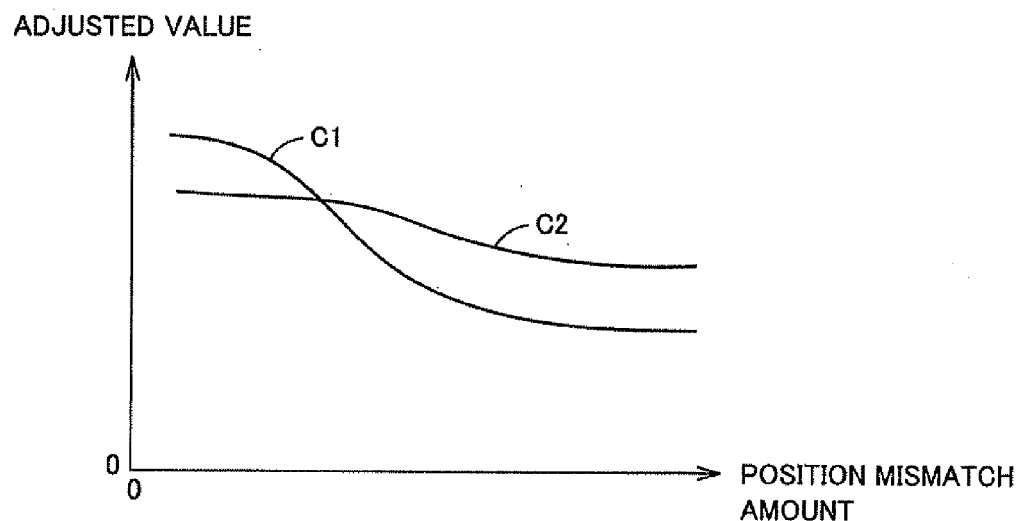
FIG. 7 shows an example of relation between the position mismatch amount and an adjusted value of the impedance matching box in the power feeding facility.

FIG. 7 shows an example of relation between the position mismatch amount and an adjusted value of impedance matching box 120 in power feeding facility 100. Referring to FIG. 7, C1 and C2 represent adjusted values of variable capacitors 122 and 124 (FIG. 2), respectively. Adjusted values C1 and C2 thus vary with the position mismatch amount. Accordingly, a map or the like is prepared by obtaining in advance the relation between the position mismatch amount and adjusted values C1, C2. Then, the map or the like is used to determine adjusted values C1 and C2 based on the position mismatch amount estimated based on the receiving voltage and reflected power.

Referring again to FIG. 4, when the adjustment process is completed in power feeding facility 100 and vehicle 200, power control unit 410 controls power supply device 110 to perform practical power feeding for charging power storage device 280 of vehicle 200.

Figure 8:
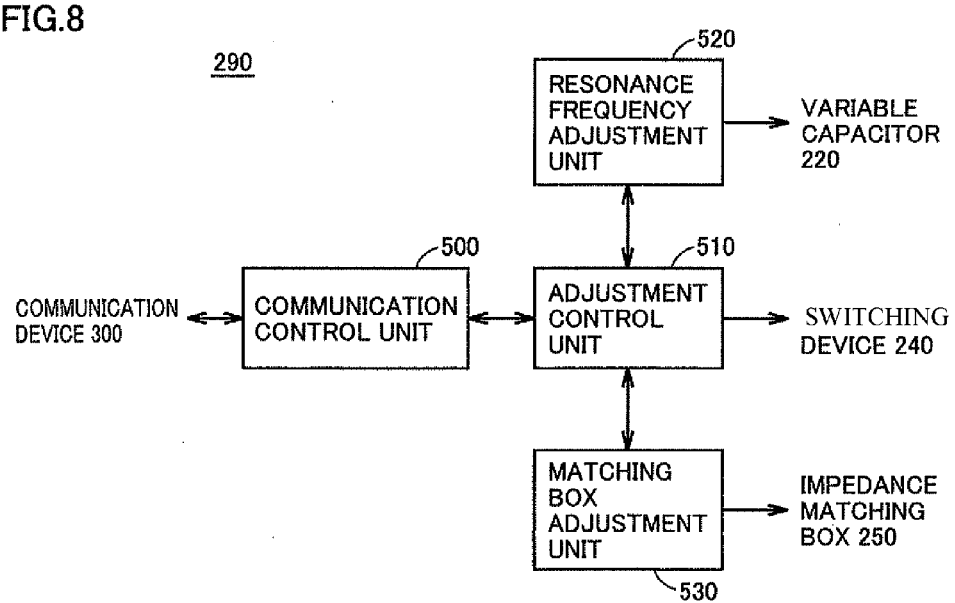
FIG. 8 is a functional block diagram of an ECU of a vehicle.

FIG. 8 is a functional block diagram of ECU 290 of vehicle 200. Referring to FIG. 8, ECU 290 includes a communication control unit 500, an adjustment control unit 510, a resonance frequency adjustment unit 520, and a matching box adjustment unit 530.

Communication control unit 500 controls the communication with power feeding facility 100 via communication device 300 (FIG. 1). Specifically, communication control unit 500 transmits a receiving state from power feeding facility 100 to power feeding facility 100. Communication control unit 500 also receives an instruction to start the adjustment process, a position mismatch amount, and information on power feeding facility 100 such as reflected power from power feeding facility 100.

When the adjustment process starting instruction is received, adjustment control unit 510 turns relays 242 and 244 of switching device 240 (FIG. 1) off and on, respectively. In other words, in response to the adjustment process starting instruction, adjustment control unit 510 disconnects the load (power storage device 280) of vehicle 200 from the resonant system and electrically connects resistive element 246.

When the adjustment process starting instruction is received, matching box adjustment unit 530 sets the impedance of impedance matching box 250 to a predetermined fixed value. As in power feeding facility 100, this fixed value is also a value prepared in advance so as to match the input impedance of the resonant system to the impedance of power supply device 110, and is determined based on the impedance of power supply device 110 of power feeding facility 100.

When the impedance of impedance matching box 250 is set to the predetermined fixed value, resonance frequency adjustment unit 520 adjusts the capacity of variable capacitor 220 to match the resonance frequency of secondary self-resonant coil 210 to the resonant frequency. Specifically, the distance between primary self-resonant coil 140 and secondary self-resonant coil 210 is estimated using the position mismatch amount received from power feeding facility 100, and the capacity of variable capacitor 220 is adjusted based on the estimated distance between the coils. It is noted that the distance between the coils estimated in power feeding facility 100 may be transmitted from power feeding facility 100 to vehicle 200, to adjust the capacity of variable capacitor 220 by using that distance between the coils.

When the adjustment of variable capacitor 220 is completed, matching box adjustment unit 530 adjusts the impedance of impedance matching box 250 to match the input impedance of the resonant system to the impedance of power supply device 110 of power feeding facility 100, based on the position mismatch amount received from power feeding facility 100.

Figure 9:
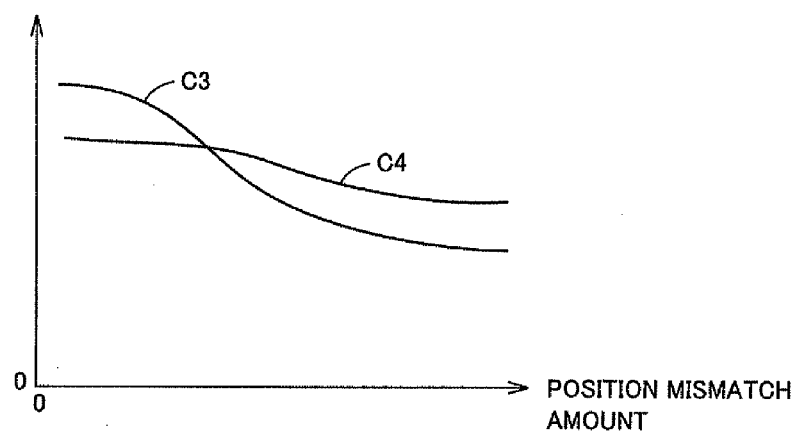
FIG. 9 shows an example of relation between the position mismatch amount and an adjusted value of the impedance matching box in the vehicle.

FIG. 9 shows an example of relation between the position mismatch amount and an adjusted value of impedance matching box 250 in vehicle 200. Referring to FIG. 9, C3 and C4 represent adjusted values of variable capacitors 122 and 124 of impedance matching box 250 (FIG. 2), respectively. Adjusted values C3 and C4 thus vary with the position mismatch amount. Accordingly, a map or the like is prepared by obtaining in advance the relation between the position mismatch amount and adjusted values C3, C4. Then, the map or the like is used to determine adjusted values C3 and C4 based on the position mismatch amount received from power feeding facility 100.

Figure 10:
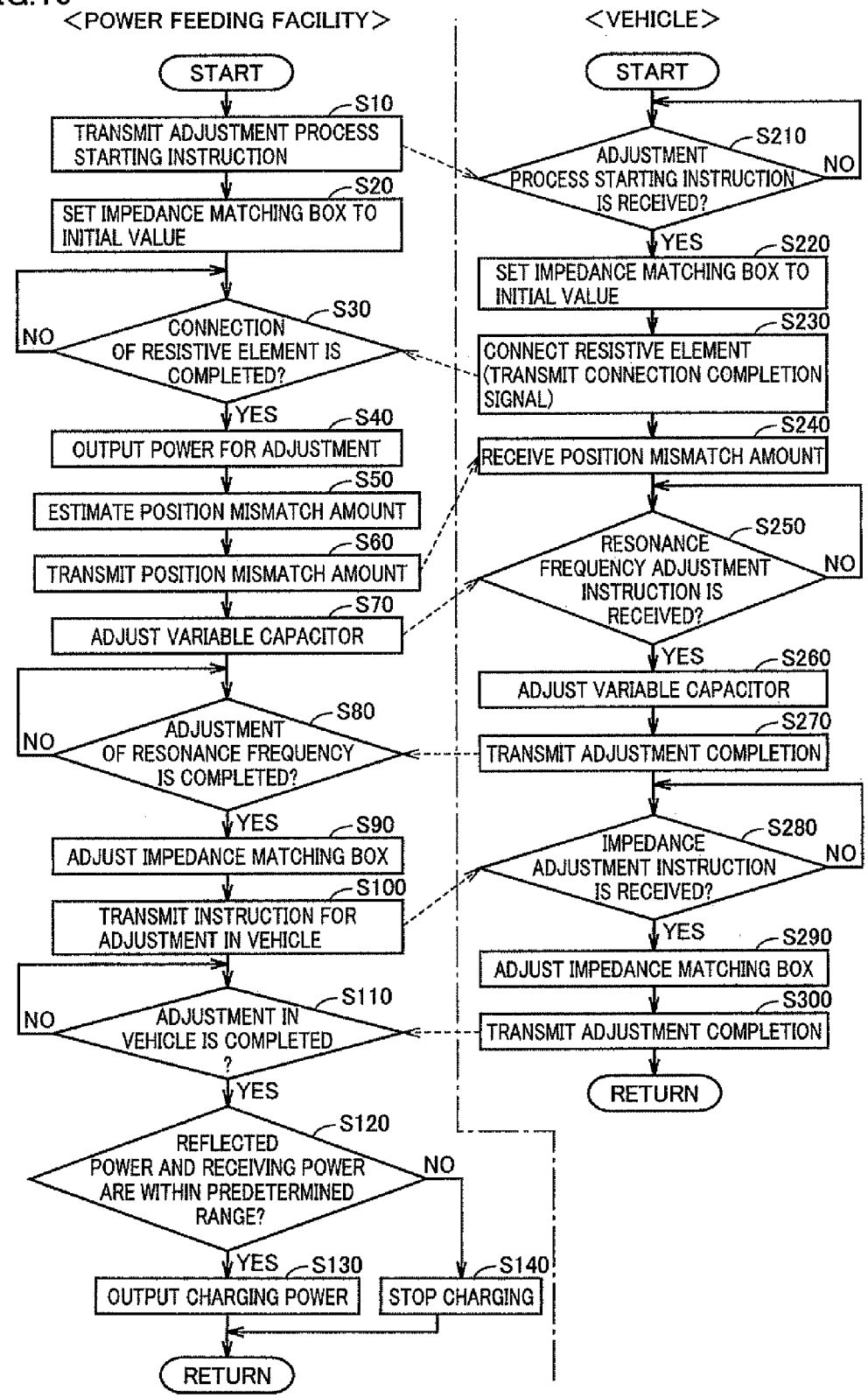
FIG. 10 is a flowchart for illustrating a process flow in the contactless power transmission system.

FIG. 10 is a flowchart for illustrating a process flow in this contactless power transmission system. Referring to FIG. 10, first, a process flow in power feeding facility 100 is described. ECU 160 of power feeding facility 100 transmits an instruction to start the adjustment process to vehicle 200 (step S10). Then, ECU 160 sets the impedance of impedance matching box 120 to a predetermined fixed value (step S20).

When a signal indicating the completion of connection of resistive element 246 in vehicle 200 is received from vehicle 200 in response to the adjustment process starting instruction transmitted to vehicle 200 in step S10 (YES in step S30), ECU 160 controls power supply device 110 to output power for adjustment (step S40). This power for adjustment is predetermined power lower than that during the practical power feeding for charging power storage device 280.

Then, ECU 160 estimates a position mismatch amount based on the detected values of a receiving voltage received from vehicle 200 and reflected power detected by power sensor 115, by using the position mismatch amount estimation map prepared in advance (FIG. 5) showing the relation between the receiving voltage of vehicle 200 and the reflected power in power feeding facility 100, and the position mismatch amount (step S50). Then, ECU 160 transmits the estimated position mismatch amount to vehicle 200 (step S60).

Then, ECU 160 estimates a distance between primary self-resonant coil 140 and secondary self-resonant coil 210 based on the estimated position mismatch amount, and adjusts the capacity of variable capacitor 150 based on the estimated distance between the coils, by using the variable capacitor capacity adjustment map prepared in advance (FIG. 6) (step S70). During the adjustment of variable capacitor 150, ECU 160 transmits an instruction to adjust the resonance frequency to vehicle 200.

When the adjustment of the resonance frequency of the self-resonant coil is completed (YES in step S80), ECU 160 adjusts impedance matching box 120 based on the position mismatch amount estimated in step S50, by using the matching box adjustment map prepared in advance (FIG. 7) showing the relation between the position mismatch amount and the adjusted value of impedance matching box 120 (step S90).

When the adjustment of impedance matching box 120 is completed, ECU 160 transmits an adjustment instruction to adjust the impedance in vehicle 200 to vehicle 200 (step S100). Then, if it is determined that the adjustment in vehicle 200 has been completed (YES in step S110), ECU 160 determines whether or not the reflected power and the receiving power in vehicle 200 are within a predetermined range (step S120). This determination process is to determine whether or not the magnitudes of the reflected power and the receiving power are appropriate relative to the power output from power supply device 110 (traveling wave power).

If it is determined that the reflected power and the receiving power are within the predetermined range (YES in step S120), ECU 160 controls power supply device 110 to output charging power for charging power storage device 280 (step S130). If it is determined in step S120 that the reflected power and the receiving power are not within the predetermined range (NO in step S120), on the other hand, ECU 160 stops power supply device 110 to stop charging of power storage device 280 by power feeding facility 100 (step S140).

Next, a process flow in vehicle 200 is described. When the adjustment process starting instruction is received from power feeding facility 100 (YES in step S210), ECU 290 of vehicle 200 sets the impedance of impedance matching box 250 to a predetermined fixed value (step S220).

Then, ECU 290 turns relays 242 and 244 of switching device 240 off and on, respectively. Thus, resistive element 246 is electrically connected (step S230). Upon the electrical connection of resistive element 246, ECU 290 transmits a signal indicating the completion of connection to power feeding facility 100. Then, ECU 290 receives the position mismatch amount transmitted from power feeding facility 100 (step S240).

Then, when the resonance frequency adjusting instruction is received from power feeding facility 100 (YES in step S250), ECU 290 estimates a distance between primary self-resonant coil 140 and secondary self-resonant coil 210 by using the position mismatch amount received in step S240. Then, ECU 290 adjusts the capacity of variable capacitor 220 based on the estimated distance between the coils, by using the variable capacitor capacity adjustment map prepared in advance (FIG. 6) (step S260).

When the adjustment of variable capacitor 220 is completed, ECU 290 transmits a signal indicating the completion of adjustment to power feeding facility 100. Then, when the adjustment instruction to adjust the impedance is received from power feeding facility 100 (YES in step S280), ECU 290 adjusts impedance matching box 250 based on the position mismatch amount received in step S240, by using the matching box adjustment map prepared in advance (FIG. 9) (step S290). When the adjustment of impedance matching box 250 is completed, ECU 290 transmits a signal indicating the completion of adjustment to power feeding facility 100 (step S300).

As described above, according to the first embodiment, in power feeding facility 100, the resonance frequency is first adjusted by controlling variable capacitor 150, and after the adjustment of the resonance frequency, the input impedance of the resonant system is adjusted by controlling impedance matching box 120. During the adjustment of the resonance frequency by variable capacitor 150, the impedance of impedance matching box 120 is set to the predetermined fixed value. In vehicle 200, too, the resonance frequency is first adjusted by controlling variable capacitor 220, and after the adjustment of the resonance frequency, the input impedance of the resonant system is adjusted by controlling impedance matching box 250. During the adjustment of the resonance frequency by variable capacitor 220, the impedance of impedance matching box 250 is set to the predetermined fixed value. According to the first embodiment, therefore, both the resonance frequency and impedance of the resonant system can be efficiently adjusted.

Second Embodiment

According to the present invention, as described above, in power feeding facility 100 and vehicle 200, the resonance frequency of the self-resonant coil is first adjusted, and after the adjustment of the resonance frequency, the impedance of the impedance matching box is adjusted. During the adjustment of the resonance frequency of the self-resonant coil by the variable capacitor, the impedance of the impedance matching box is set to the predetermined fixed value in the first embodiment, whereas a variable impedance portion of the impedance matching box is bypassed in a second embodiment.

Figure 11:
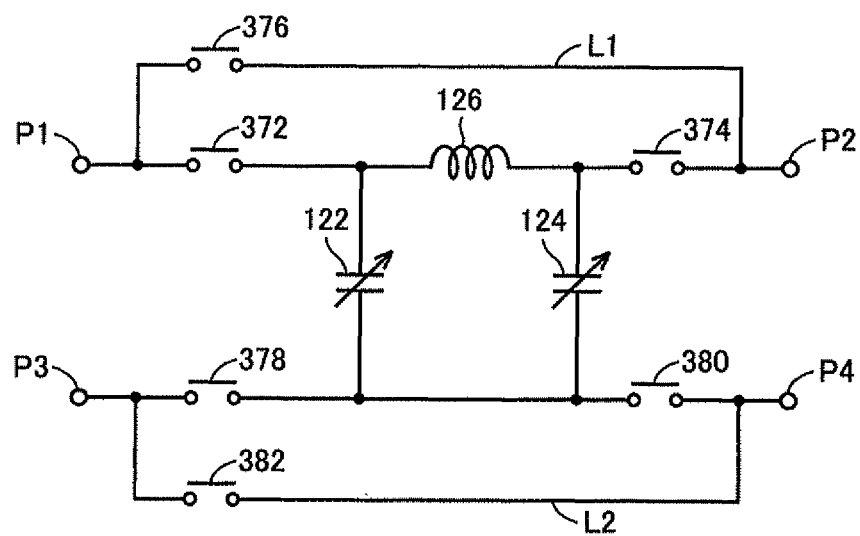
FIG. 11 is a circuit diagram showing an example of the circuit configuration of an impedance matching box in a second embodiment.

FIG. 11 is a circuit diagram showing an example of the circuit configuration of an impedance matching box in the second embodiment. Referring to FIG. 11, an impedance matching box 120A of power feeding facility 100 and an impedance matching box 250A of vehicle 200 each further include bypass paths L1, L2 and relays 372 to 382 in the configuration of impedance matching boxes 120 and 250 in the first embodiment shown in FIG. 2.

Relay 372 is connected between a connection node between variable capacitor 122 and coil 126 and a port P1. Relay 374 is connected between a connection node between coil 126 and variable capacitor 124 and a port P2. Bypass path L1 is provided between port P1 and port P2, with relay 376 provided on bypass path L1. Relay 378 is connected between a port P3 and variable capacitor 122. Relay 380 is connected between variable capacitor 124 and a port P4. Bypass path L2 is provided between port P3 and port P4, with relay 382 provided on bypass path L2.

In power feeding facility 100, relays 372 to 382 are controlled by ECU 160 (FIG. 1). During the adjustment of the resonance frequency of primary self-resonant coil 140, relays 372, 374, 378, 380 are turned off and relays 376, 382 are turned on. Thus, a variable impedance portion composed of variable capacitors 122, 124 and coil 126 is electrically disconnected, and ports P1 and P3 are directly connected to ports P2 and P4 via bypass paths L1 and L2, respectively.

In vehicle 200, relays 372 to 382 are controlled by ECU 290 (FIG. 1). During the adjustment of the resonance frequency of secondary self-resonant coil 210, relays 372, 374, 378, 380 are turned off and relays 376, 382 are turned on. Thus, the variable impedance portion composed of variable capacitors 122, 124 and coil 126 is electrically disconnected, and ports P1 and P3 are directly connected to ports P2 and P4 via bypass paths L1 and L2, respectively.

As described above, according to the second embodiment, in power feeding facility 100, the variable impedance portion of impedance matching box 120A is electrically disconnected during the adjustment of the resonance frequency by variable capacitor 150. When the adjustment of the resonance frequency is completed, the variable impedance portion is electrically connected, and the input impedance of the resonant system is adjusted. In vehicle 200, too, the variable impedance portion of impedance matching box 250A is electrically disconnected during the adjustment of the resonance frequency by variable capacitor 220. When the adjustment of the resonance frequency is completed, the variable impedance portion is electrically connected, and the input impedance of the resonant system is adjusted. According to the second embodiment, too, therefore, both the resonance frequency and impedance of the resonant system can be efficiently adjusted.

Although the order of adjustment in power feeding facility 100 and vehicle 200 is such that the adjustment is basically performed first in power feeding facility 100 in the embodiments described above, the present invention is not particularly limited to a system where the adjustment process is performed in such order.

Although both power feeding facility 100 and vehicle 200 are provided with the variable capacitor for adjusting the resonance frequency of the self-resonant coil and the impedance matching box for adjusting the input impedance of the resonant system in the embodiments described above, the present invention is also applicable when only one of power feeding facility 100 and vehicle 200 is provided with the aforementioned adjustment mechanism.

In the above description, primary coil 130 and primary self-resonant coil 140 constitute an example of "power transmission unit" in the present invention, and secondary self-resonant coil 210 and secondary coil 230 constitute an example of "power reception unit" in the present invention. Variable capacitor 220 corresponds to an example of "first adjustment device" in the contactless power receiving apparatus of the present invention, and impedance matching box 250 corresponds to an example of "second adjustment device" in the contactless power receiving apparatus of the present invention. Furthermore, ECU 290 corresponds to an example of "control device" in the contactless power receiving apparatus of the present invention, and power storage device 280 corresponds to an example of "load" in the present invention.

Moreover, variable capacitor 150 corresponds to an example of "first adjustment device" in the contactless power feeding facility of the present invention, and impedance matching box 120 corresponds to an example of "second adjustment device" in the contactless power feeding facility of the present invention. Furthermore, power supply device 110 corresponds to an example of "power supply" in the present invention, and ECU 160 corresponds to an example of "control device" in the contactless power feeding facility of the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 100 power feeding facility; 110 power supply device; 115 power sensor; 120, 120A, 250, 250A impedance matching box; 122, 124 variable capacitor; 126 coil; 130 primary coil; 140 primary self-resonant coil; 150, 220 variable capacitor; 160, 290 ECU; 170, 300 communication device; 200 vehicle; 230 secondary coil; 240 switching device; 242, 244 relay; 246 resistive element; 260 rectifier; 270 charger; 280 power storage device; 285 motive power output device; 310 voltage sensor; 312 current sensor; 350 load; 372 to 382 relay; 400, 500 communication control unit; 410 power control unit; 420 position mismatch amount estimation unit; 430, 520 resonance frequency adjustment unit; 440, 530 matching box control unit; 510 adjustment control unit; L1, L2 bypass path.

The invention claimed is:

1. A contactless power receiving apparatus for receiving electric power in a contactless manner from a power feeding facility including a power transmission unit, comprising:
  a power reception unit for resonating with said power transmission unit through an electromagnetic field to receive the power in a contactless manner from said power transmission unit;
  a first adjustment device for adjusting a resonance frequency of said power reception unit;
  a second adjustment device for adjusting an input impedance of a resonant system composed of said power transmission unit and said power reception unit; and
  a control device for first adjusting said resonance frequency by controlling said first adjustment device, and after the adjustment of said resonance frequency, adjusting the input impedance of said resonant system by controlling said second adjustment device,
  during the adjustment of said resonance frequency by said first adjustment device, said control device setting an impedance of said second adjustment device to a predetermined fixed value, wherein
  said second adjustment device includes
    a variable impedance portion provided between said power reception unit and a load for receiving the power received by said power reception unit,
    a bypass circuit for bypassing said variable impedance portion,
    a first relay provided between said power reception unit and said variable impedance portion, and
    a second relay provided between said load and said variable impedance portion,
  said bypass circuit includes
  a third relay,
  during the adjustment of said resonance frequency by said first adjustment device, said control device sets an impedance of said variable impedance portion to said fixed value by turning off said first relay and said second relay, and turning on said third relay.

2. A contactless power feeding facility for transmitting electric power in a contactless manner to a power receiving apparatus including a power reception unit, comprising:
  a power supply for generating electric power having a predetermined frequency;
  a power transmission unit for receiving the power from said power supply, and resonating with said power reception unit through an electromagnetic field to transmit the power in a contactless manner to said power reception unit;
  a first adjustment device for adjusting a resonance frequency of said power transmission unit;
  a second adjustment device for adjusting an input impedance of a resonant system composed of said power transmission unit and said power reception unit; and
  a control device for first adjusting said resonance frequency by controlling said first adjustment device, and after the adjustment of said resonance frequency, adjusting the input impedance of said resonant system by controlling said second adjustment device,
  during the adjustment of said resonance frequency by said first adjustment device, said control device setting an impedance of said second adjustment device to a predetermined fixed value, wherein
  said second adjustment device includes
  a variable impedance portion provided between said power supply and said power transmission unit,
  a bypass circuit for bypassing said variable impedance portion,
  a first relay provided between said power reception unit and said variable impedance portion, and
  a second relay provided between said load and said variable impedance portion,
  said bypass circuit includes
  a third relay,
  during the adjustment of said resonance frequency by said first adjustment device, said control device sets an impedance of said variable impedance portion to said fixed value by turning off said first relay and said second relay, and turning on said third relay.

3. The contactless power receiving apparatus according to claim 1, wherein
  said power feeding facility further includes a power supply for generating electric power having a predetermined frequency, and
  said predetermined fixed value is a value for matching the input impedance of said resonant system to an impedance of said power supply.

4. A vehicle incorporating the contactless power receiving apparatus according to claim 1.

5. The contactless power feeding facility according to claim 2, wherein
  said predetermined fixed value is a value for matching the input impedance of said resonant system to an impedance of said power supply.

* * * * *